July 15, 1969 H. A. SCHNEIDER 3,456,196

DIGITAL AUTOMATIC FREQUENCY CONTROL SYSTEM

Filed Dec. 30, 1966 2 Sheets-Sheet 1

INVENTOR
H. A. SCHNEIDER
BY John P. McDonnell
ATTORNEY

United States Patent Office 3,456,196
Patented July 15, 1969

3,456,196
DIGITAL AUTOMATIC FREQUENCY CONTROL SYSTEM

Herbert A. Schneider, Millington, N.J., assignor to Bell Telephone Laboratories, Incorporated, Murray Hill, N.J., a corporation of New York Filed Dec. 30, 1966, Ser. No. 606,141
Int. Cl. H04b 1/68
U.S. Cl. 325—329 9 Claims

ABSTRACT OF THE DISCLOSURE

An automatic frequency control system utilizing digital techniques to control a phase-locked oscillator and produce a nearly synchronous carrier from a received suppressed carrier signal of unknown carrier frequency.

This invention relates to radio receiver systems and more particularly to an automatic frequency control system for a suppressed carrier radio receiver.

Conservation of power is an important design consideration in many radio communications systems. Illustratively, the power capacity of power supply systems used in active satellite communications systems is restricted by launch weight limitations. Furthermore, since the physical remoteness of these vehicles precludes component replacement the ratio of information transmitted to the power consumed in the transmission of the information must be kept to a minium so that useful life of the satellite may be extended. In the face of these requirements, it has been found that if, after the information signals are modulated on to a carrier, a balanced modulator in the satellite transmitter suppresses the carrier frequency energy so that only the sideband signals are transmitted, then all the information can without loss be transmitted to a receiver at but a fraction of the power otherwise required. While such a suppressed carrier system eliminates carrier signal energy from the transmitted wave to produce a substantial savings in power consumption, it is not attained without some cost. The penalty that must be suffered is the increased difficulty and complexity of capturing and demodulating the transmitted signal at the receiver station.

To demodulate the received signal and extract information, a carrier must be heterodyned with the incoming suppressed carrier signal. The difficulty of demodulating such a suppressed carrier signal arises out of the necessity of reconstituting the carrier at the receiver in the face of unknown frequency variations of the carrier associated with the transmitted signal. The carrier frequency of the transmitted wave suffers variations due to a number of causes which include oscillator instability and drift as well as Doppler effects of a moving satellite. Therefore, in order to extract intelligible information from the received suppressed carrier signal, an automatic frequency control must be provided with the following; an acquisition range sufficiently large to assure capture of the transmitted signal, the capability to align the reconstituted carrier at the receiver with the carrier frequency of the transmitted wave, and the ability to thereafter maintain a phase lock between the two. That is, the incoming signal must first be captured by some means which insures that a local oscillator is operating at a frequency in the vicinity of the unknown carrier frequency of the transmitted signal and that the two frequency sources are thereafter kept in phase lock. When phase lock is achieved, the local oscillator must be a synchronous carrier—i.e., a sine wave which oscillates at a frequency equal to the frequency located on the frequency spectrum equidistant between the signal sidebands. The phase relationship between a synchronous carrier and its associated signal sidebands is identical to the phase relationship between the carrier from which the sidebands were originally generated and its associated sidebands.

In one demodulation technique developed for suppressed carrier communications systems the sideband signals are beat against each other to directly obtain a carrier signal. In this type of system phase lock is obtained with the aid of a feedback control circuit. Besides the limited acquisition range of this system, other limitations inherent in feedback loop systems force design compromises. It is known, for example, that the loop response time is reduced only at the expense of increased system bandwidth and that an increase in bandwidth permits additional extraneous signal and noise to enter the system and increase the system instability. However, the system bandwidth must be broad in order to increase the signal acquisition range. Since optimum receiver design of such a feedback loop system is limited to a judiciously made compromise, other techniques for signal acquisition and phase lock in a suppressed carrier communication system receiver have been sought.

Accordingly, it is an object of the present invention to provide in the receiver of a suppressed carrier communication system an improved arrangement for reconstituting the carrier frequency.

It is another object of this invention to provide in a suppressed carrier communication system an automatic frequency control with extended signal capture range and with an effective phase lock mechanism to insure a synchronous carrier.

In accordance with the principal features of the invention, these and other objects are achieved by providing an automatic frequency control system which utilizes digital techniques to control a phase-locked oscillator and produce a nearly synchronous carrier from a received suppressed carrier signal of unknown carrier frequency. By employing digital techniques a large signal acquisition range (i.e., the range within which the carrier frequency of the received signal may be permitted to vary and still be susceptible to being captured) is secured. Concomitant inherent advantages of the digital system include a reduction of error in signal processing and an increase in the ease with which circuit components are implemented.

The signal acquisition portion of the automatic frequency control (AFC) circuitry is implemented in a receiver having a local voltage tuned oscillator which mixes with an incoming double sideband suppressed carrier signal to produce a pair of quadrature demodulated signals. When the local oscillator is asynchronously tuned, i.e., not perfectly aligned with the carrier frequency of the received suppressed carrier signal, the received signal is imperfectly demodulated. By means of the arrangement provided, the imperfectly demodulated quadrature signals are first translated into a pair of time domain digital pulses differing in repetition rate by twice the frequency deviation between the carrier of the transmitted signal and the local oscillator. A difference counter compares these digital pulses to produce a difference count signal which is then reconverted by a digital to analog converter to a DC analog voltage. A synchronous gate, actuated by pulses appearing on a first of the translator output terminals, samples and connects the DC voltage from the converter to the local oscillator to control its frequency.

Once the local oscillator frequency has been adjusted to accurately reconstitute the carrier and capture the incoming signal, phase lock is maintained by an auxiliary circuit responsive to the translated digital pulse signals. Pulse signals from a second of the translator output terminals trigger a ramp function generator whose voltage is sampled by the synchronous gate each time a pulse appears at the first of the translator output terminals. The generator voltage sampled is, therefore, proportional to the phase difference between the local oscillator and transmitted carrier waves. By combining the outputs from the ramp generator and the digital to analog converter in series at the input to the gate, and by providing a filter to attenuate the voltage ripple, an effective AFC system is achieved. A lock indicator circuit monitors the signal from the difference counter to indicate when the receiver moves from an out-of-lock state to a synchronous or phase locked state.

The above and other features of the invention will be considered in detail in the following specification and in connection with the drawings in which.

Figure 1:
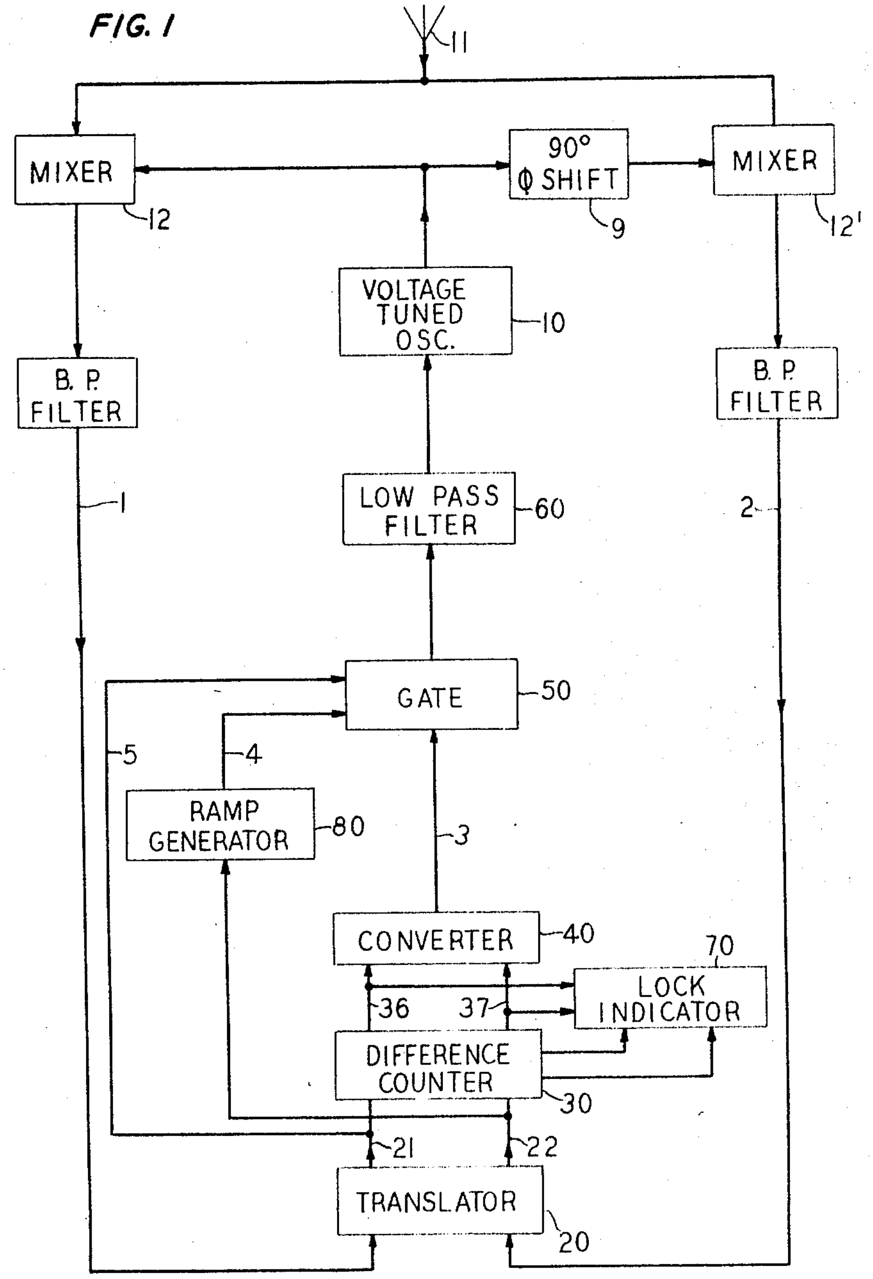
FIG. 1 is a schematic diagram in block form of one embodiment of the invention.

The block diagram of FIG. 1 shows the automatic frequency control system (AFC) in combination with a receiver similar to that described in Patent 3,060,425 granted to C. C. Cutler on Oct. 23, 1963, wherein a satellite attitude control system is disclosed. The Cutler patent describes how the principles of inverse radio interferometry can be applied in a double sideband suppressed carrier communication system to remotely control the attitude of a space satellite from a ground station. The present invention includes an improved arrangement for reconstituting the carrier frequency of the signals transmitted from the satellite so that the incoming signal can be properly demodulated over an increased signal acquisition range. In the present invention, a local voltage tuned oscillator 10 is beaten together with the received signal to produce a pair of quadrature demodulated signals. More particularly, after being received by antenna 11 and split up into a pair of channels the incoming double sideband suppressed carrier signal is fed to mixers 12 and 12′ in the in-phase and quadrature channels respectively. The output from voltage tuned oscillator 10 is fed directly to mixer 12 in the in-phase channel, while a 90-degree phase shift is introduced by network 9 before application to mixer 12′ in the quadrature channel. Of course, the incoming signal may first be down converted by receiver front-end mixing with coarse AFC corrections. Furthermore, the 90-degree phase shift may be replaced with a 45-degree phase lag when a 45-degree phase lead network is inserted between oscillator 10 and mixer 12.

If it is assumed that the voltage tuned oscillator 10 (which is designed to oscillate in the vicinity of the expected carrier frequency of the transmitted signal) is operating at a frequency differing by $\omega_e$ from the carrier frequency of the transmitted wave, then the filtered output of the in-phase channel mixer 12 will contain on conductor 1 the signal described by the function $\cos \omega_e t \cos \omega_1 t$ and the filtered output of mixer 12′ in the quadrature channel will contain on conductor 2 a signal described by the function $\sin \omega_e t \cos \omega_1 t$, where $\omega_1$ is the information signal modulated onto the carrier at the transmitter. As noted above, $\omega_e$ represents the deviation attributable to transmitter carrier frequency instability drift, Doppler effects of the moving satellite and any other possible error source contributing to the misalignment of local oscillator 10. The quadrature signals appearing on the output conductors 1 and 2 are utilized by the AFC equipment to produce a DC voltage which is applied to adjust the frequency of voltage tuned oscillator 10 so that its frequency is phase-locked in synchronism with the unknown carrier frequency of the transmitted wave.

The AFC portion of the receiver is designed to provide a signal acquisition function as well as a phase-lock function. Signal acquisition is accomplished by means of translator 20 which converts the frequency domain quadrature signals in channels 1 and 2 into a pair of time domain digital pulse signals which differ in frequency from each other by twice the error frequency $\omega_e$. A difference counter 30 receives the digital pulses produced by the translator and indicates by means of a pulse signal on an appropriate output conductor 36 or 37 both the actual difference count and whether the frequency of tuned oscillator 10 is above or below the carrier frequency of the received signal. The output of the difference counter is a digital pulse train having a repetition rate in pulses per second which is equal to $2\omega_e$. Converter 40 converts this digital information to an analog DC voltage having a magnitude directly proportional to the pulse repetition rate of the signal derived from the output of the difference counter. The analog DC voltage derived from the converter is then passed via conductor 3 to a synchronous sampling gate 50. The voltage sampled by gate 50 is filtered in low-pass filter 60 before being applied to adjust the frequency of tuned oscillator 10 so that the value of $\omega_e$ is reduced towards zero. A lock indicator 70 monitors the operation of the difference counter to indicate when phase-lock (i.e., $\omega_e$ equal to zero) is obtained. Once this occurs phase-lock is automatically maintained by the auxiliary circuit which includes translator 20, ramp function generator 80, and synchronous detector 50, as will be described in further detail hereinbelow.

Figure 2:
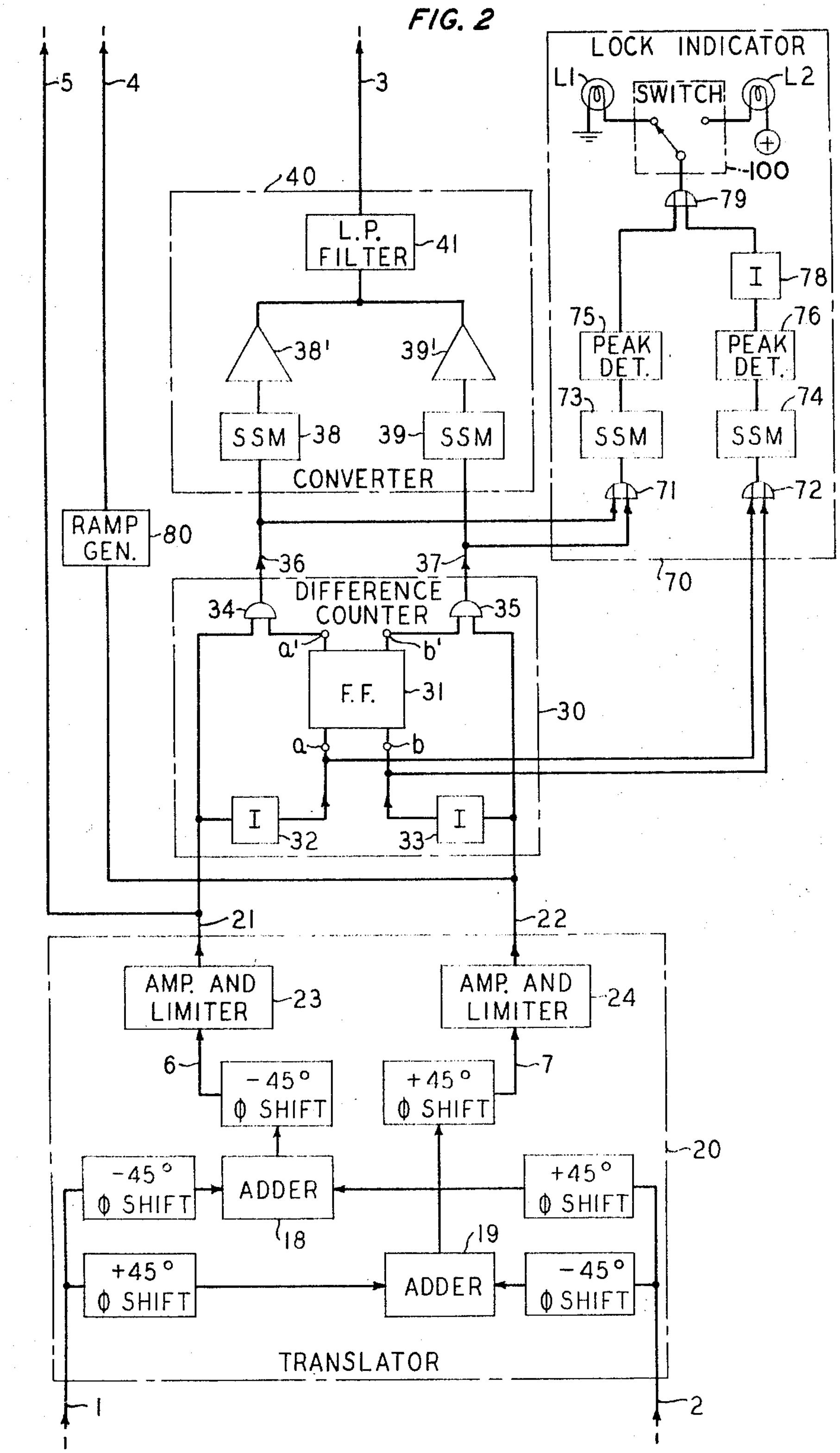
FIG. 2 is a schematic diagram shown in greater detail essential components of blocks appearing in FIG. 1.

The AFC portion of the receiver may be described in greater detail if reference is had to FIG. 2 where essential components of the system's logic blocks are described. Translator 20 receives quadrature sinusoidal signals from channels 1 and 2. Each of a pair of parallel circuits connected between channels 1 and 2 contain a pair of 45-degree angle phase shifters and a summing network in the form of a resistive adder commonly used in the art. Adder 19 in the first parallel pair forms the sum of the in-phase quadrature signal advanced by a 45-degree angle and the quadrature signal delayed by 45 degrees. The adder 18 in the second parallel path sums the in-phase quadrature signal after it has been delayed by 45 degrees and the quadrature signal after it has been advanced by 45 degrees. By trigonometrically adding the input signals and introducing an additional positive 45-degree phase shift to the sum obtained from adder 19 and a negative 45-degree phase shift to the sum obtained by adder 18, a pair of sinusoidal signals are obtained which differ in frequency by twice the error frequency $\omega_e$. If the indicated trigonometric operations are performed it can be shown that the signals appearing on conductors 6 and 7 can be described respectively by the functions $\sin [(\omega_1+\omega_e)t]$ and $\sin [(\omega_1-\omega_e)t+\pi]$. It may be noted that these signals will be 180° out of phase when phase-lock has been obtained, i.e., when $\omega_e$ is zero. Finally, by passing these sinusoidal signals through individual pulse shaping circuits, 23 and 24, a pair of time domain digital pulse signals which differ in repetition rate by twice $\omega_e$, appear on conductors 21 and 22.

The output from translator 20 in the form of a pair of digital pulses on conductors 21 and 22 is coupled to the input of difference counter 30. The difference counter 30 shown herein may be described as a preference circuit with a bistable flip-flop 31, a pair of inverters 32 and 33 and a pair of AND gates 34 and 35. Inverters 32 and 33 are employed for convenience only and are not essential to the operation of the difference counter 30. By suitably selecting transistor conductivities and switching times, and by selecting the appropriate battery polarities, the inverters 32 and 33 may be dispensed with. As shown herein, however, each inverter is employed to perform the function of changing a battery potential to a ground potential and vice versa. After comparing the number of pulses per unit time in the two pulse trains appearing at input conductors 21 and 22, respectively, difference counter 30 produces the arithmetic difference at its output terminals 36 or 37. If the pulse repetition rate of the signal on conductor 21 is greater than that of the signal appearing on conductor 22, then conductor 36 will contain (to the exclusion of conductor 37) the difference signal. On the other hand, if conductor 22 has the signal with the greater repetition rate, then only conductor 37 will have the difference signal. In a qualitative sense the difference counter 30 is similar to a counter described by T. J. Rey in an article appearing in the December 1959 Proceedings of the IRE at p. 2106, entitled, "Digital Rate Synthesis for Frequency Measurement and Control."

By way of illustrating the operation of counter 30, consider what occurs when a pulse appears on conductor 21. The pulse is inverted by inverter 32 and applied to the flip-flop input terminal *a* to set the output potential on flip-flop terminal *a'* to a value which enables AND gate 34. Of course, if flip-flop 31 is already set with the enabling potential on output terminal *a'* then the pulse in question does not affect the state of flip-flop 31. If the next pulse from translator 20 appears on conductor 21 it is passed through AND gate 34 to conductor 36. However, if the next pulse from translator 20 appeared on conductor 22, then flip-flop 31 would be reset with the appropriate potential at its output terminal *b'* to enable AND gate 35 and disable AND gate 34. Thus, after each pulse from translator 20 the flip-flop 31 is appropriately switched to enable one of the two AND gates 34 and 35 so that a particular counter 30 output conductor will receive a succeeding pulse if it emanates from the same translator output conductor transmitting the prior pulse. If the pulse repetition rates of the signals appearing on conductors 21 and 22 are equal and the pulses are staggered by at least the response time of the logic blocks, then pulses from alternate inputs will disable the previously enabled AND gate to stop all pulses from appearing at the output conductors 36 and 37. When the pulse repetition rates of the input signals appearing on conductors 21 and 22 are unequal, the excess of pulses will be gated to the corresponding output conductor of the difference counter and no pulses will be present at the other of the output conductors.

A specific counting example may be had by considering the following pulse sequence. If two pulses appear on input conductor 21 before a third pulse appears on input conductor 22, the first pulse passes through inverter 32 to input terminal *a* of flip-flop 31 to enable output terminal *a'* and AND gate 34 (assuming of course that the cumulative switching times of inverter 32 and flip-flop 31 are at least as long as the duration of the pulse itself so that a false output is not obtained from AND gate 34). When the second pulse appears on conductor 21 it will be passed by enabled AND gate 34 to output conductor 36. This second pulse is also applied to input *a* of flip-flop 31 which has since been set so that no change of state is produced. Up to this time, of course, AND gate 35 is disabled so that no output pulse appears at conductor 37. When the next pulse appears at input conductor 22 it passes through inverter 33 to input terminal *b* of flip-flop 31 to change the state therein, disable AND gate 34 and enable AND gate 35. Up to this point counter 30 has delivered one output pulse, or the difference between the number of pulses appearing on conductors 21 and 22 respectively. If the next pulse in time sequence should then appear at conductor 22 it will be passed by AND gate 35 to conductor 37. However, if the fourth pulse should appear on conductor 21, the result will be that AND gate 34 is once more enabled and AND gate 35 is disabled so that no pulse appears on either of the output conductors 36 or 37. In this fashion counter 30 gives a running indication of the difference in the number of pulses applied to its two input terminals.

The output from the difference counter is fed to the digital-to-analog converter 40 which has a single shot multivibrator and amplifier connected sequentially between each of the two input conductors 36 and 37 and a common low-pass filter network 41. As described above, one or the other of conductors 36 or 37 will contain digital pulse information from difference counter 30. Each incoming pulse triggers the receiving single shot multivibrator which acts as a pulse stretcher to provide a pulse train with a DC component proportioned to the number of pulses per unit time appearing on the appropriate counter output conductor. Illustratively, if the pulse frequency of the signal appearing on conductor 21 is greater than that of the signal appearing on conductor 22, then conductor 36 at the output of the difference counter will have the difference count in the form of a pulse signal while conductor 37 will have no signal. In such a case, the signal on conductor 36 passes through single shot multivibrator 38 and positive polarity amplifier 38' to the low-pass filter 41 to emerge at conductor 3 as a positive DC potential. On the other hand, if the pulse repetition rate appearing on conductor 22 exceeds that of the signal appearing on conductor 21 then digital pulse information appears on conductor 37 for transmission to single shot multivibrator 39 and negative polarity amplifier 39' before application to low-pass filter 41 and appearance on conductor 3 as a negative DC potential. The potential appearing on conductor 3, therefore, indicates first by its polarity which of conductors 21 and 22 has a signal with a greater pulse signal repetition rate and secondly by its magnitude the very difference in those rates. Stated differently, the DC potential on conductor 3 is indicative of the direction and magnitude of the deviation in frequency of the local voltage tuned oscillator 10 from the carrier frequency of the transmitted wave received by the receiver. This DC voltage is, as described heretofore, applied through synchronous gate 50 and low-pass filter 60 to the input of voltage tuned oscillator 10 to produce the required adjustment in frequency. Appropriate control of local voltage tuned oscillator 10 may generally be accomplished according to the method described by John P. Costas in an article entitled "Synchronous Communications" appearing in Proceedings of the IRE for December 1956 beginning at p. 1713.

Figure 3:
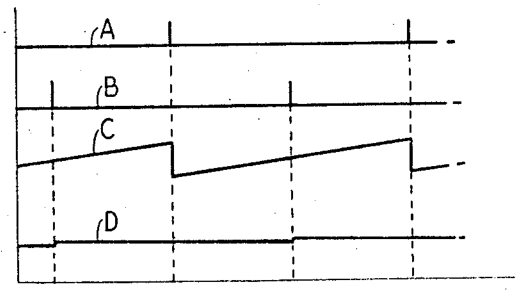
FIG. 3 is a graphical representation of typical waveforms helpful in the explanation of the phase lock portion of the system.

When voltage tuned oscillator 10 is in phase synchronism with the carrier frequency of the transmitted suppressed carrier double sideband signal, no signals appear on either conductors 36 or 37 and consequently no DC voltage appears on conductor 3. However, conductors 21 and 22 at the output of translator 20 contain pulses which are of the same repetition rate and which alternate in time sequence. Curves A and B in FIG. 3 illustrate the waveforms appearing on conductors 22 and 21 respectively. Each pulse appearing on conductor 22 triggers a ramp generator 80 having the waveform indicated in curve C of FIG. 3. This ramp voltage is fed via a conductor 4 to the synchronous gate 50 which is opened every time it is pulsed via conductors 21 and 5. Illustratively, synchronous gate 50 may be a transistor gate circuit designed so that when the gate is activated by a pulse on conductor 5 the sampled voltage comprises the sum of serially connected voltages on conductors 3 and 4. An example of this type of gate may be found in Patent 3,202,936. In such an arrangement the DC voltage on conductor 3 will predominate until voltage tuned oscillator 10 is near phase-lock, whereupon the voltage on conductor 4 will assume a position of dominance. This accomplishes the signal acquisition and phase-lock functions respectively. After phase-lock is achieved the output from synchronous detector gate 50 is represented by curve D in FIG. 3 which is for all intents and purposes a substantially constant voltage having a very small negative slope which is interrupted by an almost imperceptible discontinuity each time a pulse appears on conductors 21 and 5. This voltage shown in curve D is applied through low-pass filter 60 to control the frequency of voltage tuned oscillator 10 so that a phase-lock condition is maintained after the incoming signal has been captured.

A lock indicator arrangement 70 is also provided in connection with the circuitry described. The lock indicator arrangement 70 is designed so that an indicator such as lamp L1 will be actuated until voltage tuned oscillator 10 is in phase synchronism. When this occurs lamp L1 will be extinguished and an indicator lamp L2 will be ignited to indicate that phase-lock is attained. The input to the lock indicator circuit 70 is obtained from two different points in the AFC system in order to insure that either the absence of a received signal by the receiver antenna 11, or a failure in the system front end between antenna 11 and difference counter 30 is not improperly interpreted as a phase-locked condition. A first monitor circuit, including OR gate 72, single shot multivibrator 74, peak detector 76 and inverter 78, is coupled to the input terminals *a–b* of flip-flop 31 in difference counter 30. A second monitor circuit is coupled to the conductors 36 and 37 at the output of counter 30 and includes OR gate 71, single shot multivibrator 73 and peak detector 75, all of which are identical to their respective counterparts in the first monitor circuit. A common OR gate 79 couples each monitor circuit to a (transistor) switch 100 which selects the appropriate indicator. The cascaded circuitry which is common to each monitor circuit (an OR gate, a single shot multivibrator and a peak detector) is, in the illustrative embodiment, designed so that a positive going pulse input to the OR gate results in a battery potential output from the detector, while a zero (or ground) OR gate input signal produces a zero (or ground) detector output signal.

As a consequence of this logic, if the receiver is operating properly, negative going pulses appearing on conductors 21 and 22 at the output of translator 20 are inverted by inverters 32 and 33 and transmitted as positive going pulses to OR gate 72. These pulses emerge from detector 76 as a battery potential which after inversion by inverter 78 becomes a zero (or ground) potential applied to OR gate 79. If the local oscillator 10 is in phase synchronism, there is no pulse output on conductors 36 and 37 so that the output from detector 75 is a zero (or ground) potential. In such a case, where both inputs to OR gate 79 are zero, switch 100 selects a connection to energize lamp L2 and indicate that phase-lock in attained. However, if local oscillator 10 is asynchronous, then positive going pulses will appear on either conductor 36 or conductor 37 and detector 75 will present a battery potential to OR gate 79. This positive potential causes switch 100 to connect to lamp L1 to indicate asynchronous operation.

If a front-end failure of the type described does occur, then there will be no pulse signals either on conductors 21 and 22 or on conductors 36 and 37. Consequently, OR gate 72 will receive a zero (or ground) signal and OR gate 79 will receive from inverter 78 a battery potential to effect an energization of asynchronous indicating lamp L1. It is to be noted that, by appropriately selecting the battery potentials and transistor conductivities, the monitor circuit which is coupled to the input terminals *a–b* of flip flop 31 may be redesigned to eliminate either inverter 78 or inverters 32 and 33 or all.

It is to be understood that the above-described arrangements are illustrative of the application of the principles of this invention. Numerous other arrangements may be devised by those skilled in the art without departing from the spirit and scope of the invention.

What is claimed is:

1. In a suppressed carrier signal radio receiver having a local voltage controlled oscillator for generating a reconstituted carrier signal and means for mixing said oscillator signal with the received suppressed carrier signal to obtain a pair of quadrature signals which are incompletely demodulated in separate channels when said local oscillator is asynchronous, the improvement comprising a digital automatic frequency control means including a signal translator responsive to said pair of demodulated signals to produce a digital pulse signal on each of a pair of output terminals, said digital pulse signals having repetition rates which differ from each other by an amount proportional to the deviation in frequency alignment between said local oscillator and said carrier frequency of said received signal, a difference counter coupled to said translator output terminals for comparing said digital pulse signals and producing on a selected one of two output terminals a digital pulse error signal indicative of the direction and magnitude of the misalignment in said local oscillator, means coupled to said counter for converting said error signal into a proportional DC voltage, and means for applying said DC voltage to said local oscillator to align the frequency of said local oscillator with the carrier frequency of said suppressed carrier signal to produce a synchronous reconstituted carrier signal.

2. An improved suppressed carrier signal radio receiver in accordance with claim 1 wherein said means for applying said DC voltage to said local oscillator includes a filtered sampling gate, means for connecting a first of said pair of translator output terminals to said gate, said gate being responsive to each signal pulse on said first translator output terminal to sample and connect said DC voltage from said converter to said local oscillator.

3. An improved suppressed carrier signal radio receiver in accordance with claim 2 further comprising an auxiliary means for maintaining a synchronous local oscillator frequency once said local oscillator is aligned including a pulse actuated voltage generator coupled between the second of said pair of translator output terminals and said sampling gate so that the sum of the output voltage from said generator and said DC voltage produced by said converter are sampled.

4. An improved suppressed carrier signal radio receiver in accordance with claim 3 wherein said sampling gate includes a low-pass filter and wherein the sampled voltage contribution from said generator is proportional to the phase difference between said local oscillator and the carrier of said suppressed carrier signal and is attenuated by said filter until synchronous operation is achieved.

5. An improved suppressed carrier signal radio receiver in accordance with claim 4 wherein said generator produces a ramp function voltage.

6. An improved suppressed carrier signal radio receiver in accordance with claim 2 further comprising a lock indicator circuit to indicate synchronous operation including a first monitor circuit coupled to said translator to produce a first DC voltage in response to the presence of and a second DC voltage in response to the absence of digital pulse signals on either of said translator output terminals, a second monitor circuit coupled to said difference counter to produce a first DC voltage in response to the presence of and a second DC voltage in response to the absence of an error signal appearing on either of said counter output terminals, and switching means coupled to said monitor circuits responsive to said first DC voltage from either of said monitor circuits to activate a first indicator and responsive to said second DC voltage from both of said monitor circuits to activate a second indicator.

7. An improved suppressed carrier signal radio receiver in accordance with claim 2 wherein said translator includes a pair of circuit branches connected in parallel between said quadrature signal channels to produce a pair of sinusoidal signals which differ in frequency by twice the frequency deviation between said local oscillator and the carrier of said received suppressed carrier signal, means for delaying said pair of sinusoidal signals so that they appear out of phase when said local oscillator is aligned to the carrier frequency of said received suppressed carrier signal, and amplifier-limiter means coupled to said delaying means for shaping said delayed sinusoidal signals onto a pair of pulse signals.

8. An improved suppressed carrier signal radio receiver in accordance with claim 7 wherein each of said pair of circuit branches includes a series circuit having a pair of phase shifters separated by a signal combining network, one of said pair of phase shifters in each branch is of a type which introduces a phase advance and the other of said pair is of a type which introduces a phase lag, branch phase shifters connected to the same quadrature signal channel are of opposite types, and wherein said means for delaying said pair of sinusoidal signals includes a pair of phase shifters of opposite type connected individually to each of said signal networks.

9. An improved suppressed carrier signal radio receiver in accordance with claim 8 wherein each of said phase shifters introduces a 45-degree phase shift so that said pair of sinusoidal signals appear 180 degrees out of phase when said local oscillator is aligned.

References Cited

UNITED STATES PATENTS

| | | |
|---|---|---|
| 3,101,448 | 8/1963 | Costas. |
| 3,391,341 | 7/1968 | Eddy. |

KATHLEEN H. CLAFFY, Primary Examiner

BARRY PAUL SMITH, Assistant Examiner

U.S. Cl. X.R.

325—419, 420; 329—50; 331—12, 17